(12) United States Patent
Sekula et al.

(10) Patent No.: US 11,179,768 B2
(45) Date of Patent: Nov. 23, 2021

(54) METHOD OF PREPARATION OF SAND CASTING MOULDS WITH A PROTECTIVE COATING

(71) Applicant: ABB sp. z o.o., Warsaw (PL)

(72) Inventors: Robert Sekula, Cracow (PL); Grzegorz Kmita, Giebułtów (PL); Andrzej Rybak, Cracow (PL); Dariusz Bednarowski, Cracow (PL); Lukasz Matysiak, Cracow (PL); Radek Javora, Hrusovany u Brna (CZ)

(73) Assignee: ABB sp. z o.o, Warsaw (PL)

( * ) Notice: Subject to any disclaimer, the term of this patent is extended or adjusted under 35 U.S.C. 154(b) by 0 days.

(21) Appl. No.: 17/101,130

(22) Filed: Nov. 23, 2020

(65) Prior Publication Data
US 2021/0069775 A1   Mar. 11, 2021

Related U.S. Application Data

(63) Continuation of application No. PCT/PL2019/050032, filed on May 27, 2019.

(30) Foreign Application Priority Data

May 28, 2018 (PL) .......................... 425754

(51) Int. Cl.
*B22C 9/02* (2006.01)
*B22C 3/00* (2006.01)
(Continued)

(52) U.S. Cl.
CPC ................. *B22C 9/12* (2013.01); *B22C 3/00* (2013.01); *B22C 9/02* (2013.01); *B33Y 10/00* (2014.12)

(58) Field of Classification Search
CPC .. B33Y 10/00; B22C 9/02; B22C 3/00; B29C 33/3807
See application file for complete search history.

(56) References Cited

U.S. PATENT DOCUMENTS 8,137,607 B2   3/2012   Kloeb et al.
2017/0320128 A1* 11/2017   Deters ................. C04B 35/6303

FOREIGN PATENT DOCUMENTS

EP   1736566 A1   12/2006
EP   3053671 A1   8/2016

OTHER PUBLICATIONS

European Patent Office, International Search Report & Written Opinion issued in corresponding Application No. PCT/PL2019/050032, dated Sep. 2, 2019, 10 pp.

* cited by examiner

*Primary Examiner* — Kevin E Yoon
(74) *Attorney, Agent, or Firm* — Leydig, Voit & Mayer, Ltd.

(57) ABSTRACT

A method of making sand casting moulds with a protective coating for a multiple process of reactive moulding of insulation components and products made by filling up a mould cavity with polymer materials, including composites, based particularly on epoxy resins or composites based on cellulose materials, the method wherein the process of infiltration of the mould structure is performed chemically by soaking through the raw mould structure with chemosetting or thermosetting material. The application of a protective layer on external surfaces of a sand casting mould is done by means of any spraying, immersion or deposition method, whereas material with anti-adhesive properties is used for the protective coating in the form of organic chemosetting, thermosetting, light-curing material or in the form of inorganic material, including metal.

8 Claims, 3 Drawing Sheets

Figure 1:
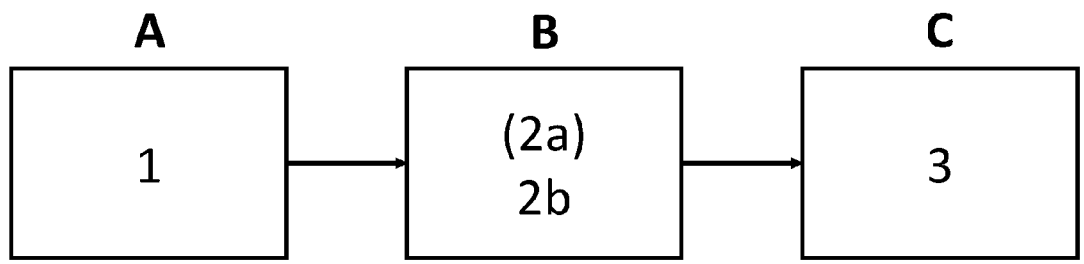

(51) Int. Cl.
*B33Y 10/00* (2015.01)
*B22C 9/12* (2006.01)

METHOD OF PREPARATION OF SAND CASTING MOULDS WITH A PROTECTIVE COATING

The subject of an invention is the method of preparation of sand casting moulds with a protective coating, designated for a multiple process of reactive moulding of insulation components and products made by filling up of a mould cavity with polymer materials, including composites, based particularly on epoxy resins or composites based on cellulose materials.

In processes of making different products, particularly in electrotechnical engineering, such as transformers, bushings, cast poles, the bodies of which are made of thermoset materials, metal moulds are applied, usually made of stainless steel, but also aluminium. The process of making moulds for casing geometrically complex products is costly and time consuming, and very frequently, especially in case of small batch production, both time and costs are crucial. That is why, nowadays, moulds are frequently made with the use of additive manufacturing technologies (3D printing), both from polymer materials and metallic powders.

There are some known methods of mould making from mineral material in the form of quartz sand for casing resin products with the use of 3D printing technology, based on the technology of selective bonding of powdered materials (e.g. gypsum, sand, metal) by means of a binder (binder jetting). It is the fastest and the cheapest additive method, which enables printing of large objects (up to several metres); that is why, it can be used for making moulds for large resin casts. This technology is often used for making sand casting moulds applied in metal casting. In such case, a mould can be used only once, since after casting with liquid metal and its crystallisation, it is damaged when a cast product is produced.

An inconvenience relating to this method is the fact that the surface and structure received as a result of sand printing is very porous and in case of contact with epoxy resin, it creates permanent bonding, which makes it impossible to use it again.

The method of producing sand casting moulds for the automotive industry in the additive manufacturing technology is known from the U.S. Pat. No. 8,137,607 patent description. The method presented includes mould fabrication and the way of using the mould for making cast parts or elements. The method of sand casting mould performance includes the following steps: printing of numerous layers of foundry sand with an activator mixture in the 3D technology; an overprint for each sand layer of adhesive resin in order to mould a matrix. Whereas, after printing of the last matrix layer, vacuum suction of infiltrating resin is conducted through sand layers at the depth more than 1 mm and infiltrating resin is hardened after it has been absorbed in the matrix, in accordance with the known hardening technologies, whereas the process of sand layers hardening takes as long as the matrix is infiltrated. The method of making cast parts or elements consists in using a matrix made by means of a sequential application of layers made of sand mixture with an activator and resin printing for layers being created in order to form a base wall, side walls on the base wall and a pattern also located on the base wall in order to form a mould cavity; next, a coating made of hardened resin is formed on the base wall, side walls and the pattern, and a mould cavity made in this way is used for making a finished part or element.

The presented known solution is not sufficient for ensuring a proper process of casting resin or cellulose products, since it does not provide easy moulding and adequate resistance for multiple elements moulding, particularly in case of large items. Furthermore, this solution uses a vacuum technique for mould cavity infiltration, which complicates the process.

The essence of the method of making sand casting moulds with a protective coating according to the invention is that infiltration of the mould structure is done chemically, avoiding vacuum suction of infiltrating resin through the layers of foundry sand with activator mixture, and the infiltration process consists in saturating of the raw mould structure with chemosetting or thermosetting material, using a surface method in the external layer of the mould or using a volume method throughout the volume of the mould structure. A protective layer is applied on external surfaces of a sand casting mould by means of any spraying, immersion or deposition method, whereas material with anti-adhesive properties is used for a protective coating in the form of organic chemosetting, thermosetting, light-curing material or in the form of inorganic material, including metal. The operation of applying of an external protective coating is carried out until a uniform continuous coating is obtained, with total pore closing in the structure of the surface mould layer.

Favourably, the material applied for infiltration of the sand casting mould structure is chemosetting or thermoset material with viscosity ranging from $1\times10^{-4}$ Pa·s to 10 Pa·s and surface tension in relation to the air ranging from 10 mN/m (or dyne/cm) to 200 mN/m (or dyne/cm), measured at the temperature of 20° C., and selected, in relation to grain size of sand used for mould printing, in such a way that spontaneous penetration of sand casting mould structure is ensured while utilising capillary mechanisms in the mould structure.

Favourably, the operation of applying of the protective layer on external surfaces of a sand casting mould by means of the deposition method is conducted by means of Physical Vapour Deposition (PVD) or Chemical Vapour Deposition (CVD) from the gas phase.

Favourably, the process of sand casting mould structure infiltration and the process of protective coating application are performed by means of the spraying or immersion method, manually or automatically.

Favourably, in the process of sand casting mould structure infiltration resin materials, and particularly, acrylic, epoxy or polyurethane resins are used as chemosetting material.

Favourably, in the process of sand casting mould structure infiltration silanes, silicates, siloxanes and hybrid systems containing mixtures of those materials are used as thermoset material.

Favourably, in the protective coating application process PTFE-based (polytetrafluoroethylene) fluoropolymer materials, PFA (perfluoroalkoxy alkanes), FEP (fluorinated ethylene propylene), ETFE (ethylene tetrafluoroethylene copolymer) are used as organic material on external surfaces of a sand casting mould.

Favourably, in the protective coating application process metallic materials and Diamond-Like Carbon (DLC) coatings are used on external surfaces of a sand casting mould as inorganic material.

An advantage of the method according to the invention is achieving mechanical reinforcement of the sand casting mould structure and avoidance of resin or cellulose penetration to the mould while casting a product made of polymer materials or moulding elements from cellulose. A mould made in this way can be used many times, which significantly reduces the costs of finished product manufacturing.

The method enables obtaining an external protective layer on a mould, which is resistant to abrasion and ensuring adequate anti-adhesive properties in relation to the material used for moulding of a finished product. Furthermore, this solution does not use a vacuum technique for mould cavity infiltration, which simplifies the process, since it is performed without any techniques supporting mould infiltration and applying of anti-adhesive protective coatings.

Figure 2:
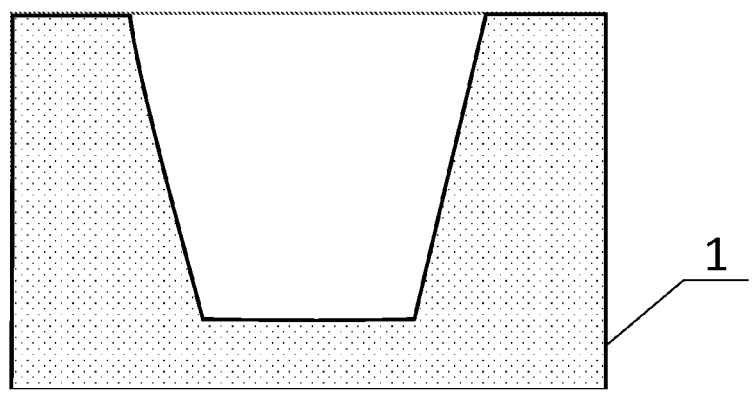
Figure 3:
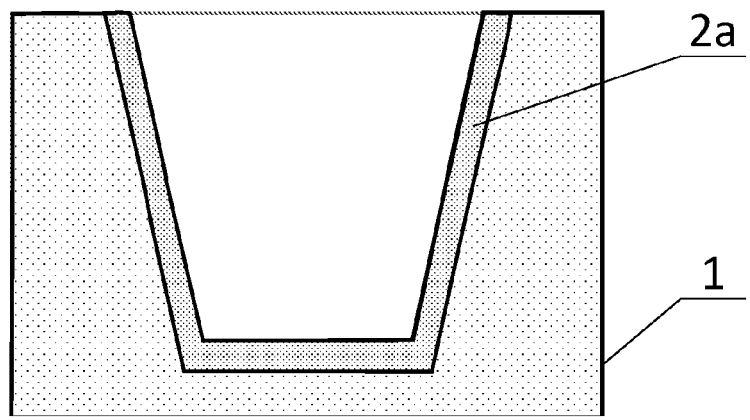
Figure 4:
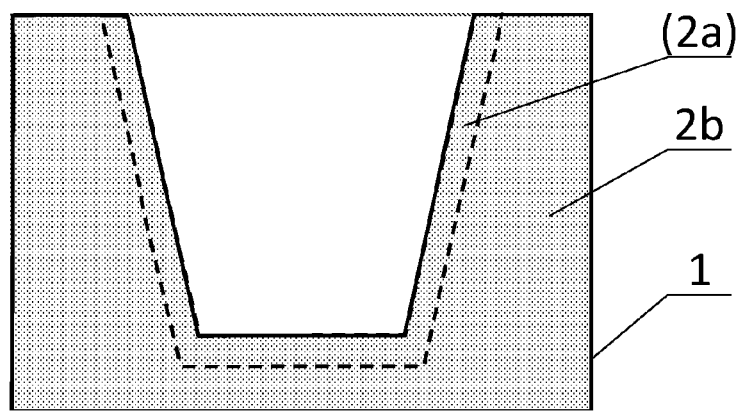
Figure 5:
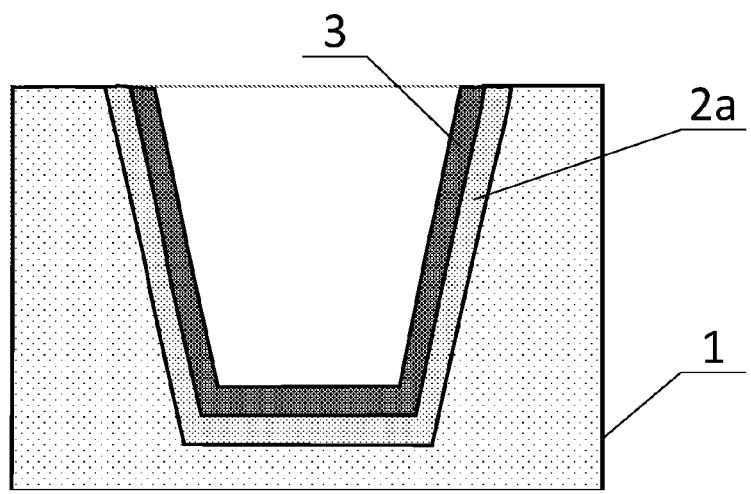
Figure 6:
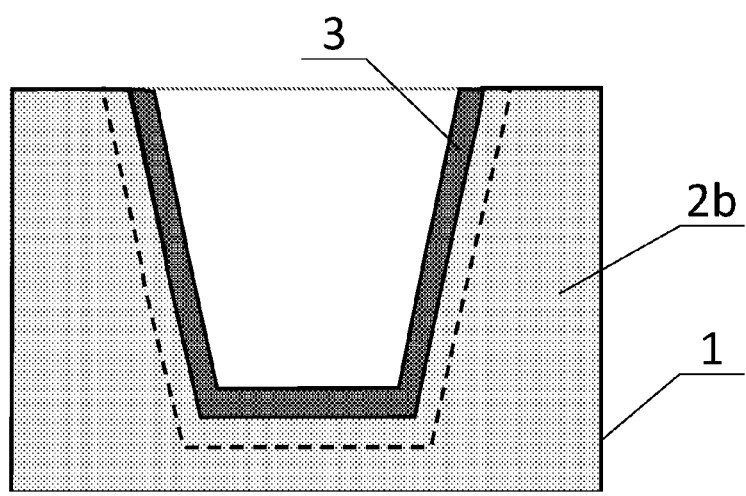

The method according to the invention is explained in detail on the basis of its performance, based on a figure in which FIG. 1 presents three-stage, A, B and C block diagram of the method performance, FIG. 2 presents a sand casting mould 1 in a raw condition, after the completion of the first stage A of the method performance according to the invention, FIG. 3 presents a sand casting mould after the completion of the second stage B of the method performance according to the invention, in the first method of making mould 2a, FIG. 4 presents a sand casting mould after the completion of the second stage B of the method performance according to the invention, in the second method of mould performance 2b, FIG. 5 presents a sand casting mould with a protective coating 3 after the completion of the third stage C of the method performance according to the invention for the first method of mould performance 2a, and FIG. 6 presents a sand casting mould with a protective coating 3 after the completion of the third stage C of the method performance according to the invention for the second method of mould performance 2b.

The method of making sand casting moulds with a protective coating covers three production stages: A, B and C, taking place after completion of each stage.

The first stage A consists in applying of a known 3D printing technology in order to obtain raw sand casting mould 1 designated to mould a finished product. Stage one A covers application of numerous layers of foundry sand with a mixture of activator in 3D technology, while using resin overprint for each layer in order to reinforce the structure interior of a raw mould produced in this way.

At the second stage B, a raw sand mould undergoes a chemical infiltration process by means of organic chemosetting, thermosetting, light-curing material, inorganic material or hybrid organic-inorganic material in order to obtain uniform internal structure 2 of the mould, without using vacuum infiltration for a raw mould. Infiltrating substances used for improving mould consistency are selected in such a way as to ensure spontaneous penetration of sand casting mould structure utilising capillary mechanisms, without any need to apply vacuum techniques as a means supporting penetration. The infiltration process is conducted either on the surface method 2a or throughout the volume 2b, whereas in both cases the impregnating process is performed many times and so long as adequate structure quality is obtained, i.e. a required pore closure is achieved, the surface is even, as well as its roughness is reduced and surface smoothness is ensued. The infiltration process on the surface consists in applying of an infiltration substance only on the external mould surface 2a. An infiltration process performed throughout the volume consists in applying of an infiltration substance, which soaks thoroughly through the mould structure 2b. The infiltration stage B of a raw mould is conducted by means of a spraying, immersion or any other method, whereas the infiltration operation is performed automatically or semi-automatically. Examples of the materials used for mould infiltration include chemosetting or thermosetting materials, such as acrylic, epoxy or polyurethane resins, silanes, silicates (including water glass), siloxanes and hybrid systems containing combinations of the above-listed materials. Chemosetting or thermosetting materials used for raw mould infiltration should be characterised by viscosity ranging from $1 \times 10^{-4}$ Pa·s to 10 Pa·s and surface tension in relation to the air ranging from 10 mN/m (or dyne/cm) to 200 mN/m (or dyne/cm), measured in the temperature of 20° C.

Next, at the third stage C, after infiltration 2 the mould undergoes the process of applying of an external protective coating, and this stage is performed until an external coating 3 is obtained with the continuous layer structure and with a desired adequate layer thickness, characterised by adhesive properties in relation to the material used for moulding of a finished product. The process of applying protective coatings is performed by means of a spraying, immersion, powder painting or any other specialist method of applying coatings, for instance, the Physical Vapour Deposition (PVD) method or the Chemical Vapour Deposition (CVD) method, whereas the applying operation is conducted automatically or semi-automatically. It is also possible to use a manual way of coating application, by means of a brush or a painting roller. Chemosetting, thermosetting or light-curing materials, such as organic materials, for example on the basis of fluoropolymer materials: PTFE (polytetrafluoroethylene), PFA (perfluoroalkoxy alkanes), FEP (fluorinated ethylene propylene), ETFE (ethylene tetrafluoroethylene copolymer), metallic materials and other inorganic materials, e.g. Diamond-Like Carbon (DLC) coatings, are used as substances for making an external protective coating of a mould.

The invention claimed is:

1. A The method of making sand casting moulds with a protective coating, comprising
   printing of a sand casting mould in 3D technology, infiltration of a sand casting mould structure and the application of a protective layer on external surfaces of the sand casting mould, wherein the infiltration process of the mould structure is performed chemically, thus avoiding vacuum suction of infiltrating resin through a plurality of layers of foundry sand with a mixture of activator, whereas the infiltration process is realised through a soaking of raw mould structure with chemosetting or thermosetting material, by a surface method on the external layer of a mould or by means of a volume method throughout the volume of mould structure, whereas the application of a protective layer on external surfaces of a sand casting mould is performed by any spraying, immersion, powder painting method or a deposition method, whereas material with anti-adhesive properties in the form of organic chemosetting, thermosetting, light-curing material or in the form of inorganic material in that metal is used as material for a protective coating, and the applying of an external protective coating is performed until uniform continuous coating with complete closure of pores in the structure of a surface mould layer is achieved.

2. The method according to claim 1, wherein the infiltration of the sand casting mould structure chemosetting or thermoset material is used with viscosity ranging from $1 \times 10^{-4}$ Pa·s to 10 Pa·s and surface tension in relation to the air ranging from 10 mN/m (or dyne/cm) to 200 mN/m (or dyne/cm), measured at the temperature of 20° C., and selected, in relation to grain size of sand used for mould printing, in such a way that spontaneous penetration of sand casting mould structure is ensured while utilising capillary mechanisms in the mould structure.

3. The method according to claim 1, wherein the applying of the protective layer on external surfaces of a sand casting mould by means of a deposition method is conducted by means of Physical Vapour Deposition (PVD) or Chemical Vapour Deposition (CVD) from the gas phase.

4. The method according to claim 1, wherein the infiltration of sand casting mould structure and the applying of a protective coating is performed by a spraying or immersion method, manually or automatically.

5. The method according to claim 1, wherein in the infiltration of sand casting mould structure resin materials, and particularly acrylic, epoxy or polyurethane resins are used as chemosetting material.

6. The method according to claim 1, wherein in the infiltration of sand casting mould structure silanes, silicates, siloxanes and hybrid systems containing mixtures of the above-listed materials are used as thermoset material.

7. The method according to claim 1, wherein in the protective coating application PTFE-based (polytetrafluoroethylene) fluoropolymer materials, PFA (perfluoroalkoxy alkanes), FEP (fluorinated ethylene propylene) and ETFE (ethylene tetrafluoroethylene copolymer) are used on external surfaces of a sand casting mould as organic material.

8. The method according to claim 1, wherein in the protective coating application process metallic Diamond-Like Carbon (DLC) type materials are used on external surfaces of a sand casting mould as inorganic material.

\* \* \* \* \*